April 15, 1952 H. L. KELDERMAN 2,592,707
VEHICLE WHEEL AND MOUNTING MEANS THEREFOR
Filed June 14, 1949
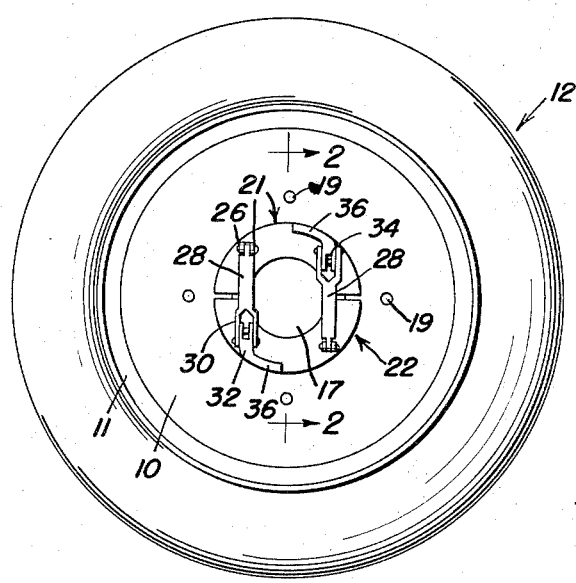
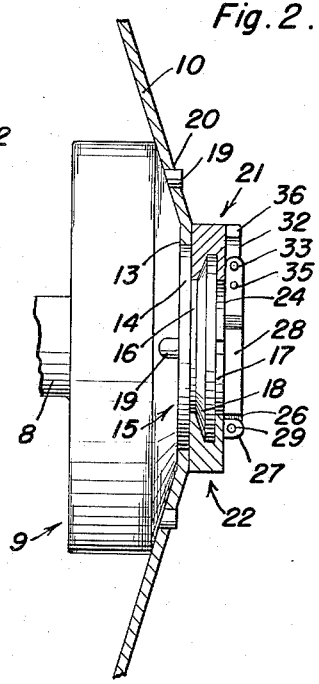
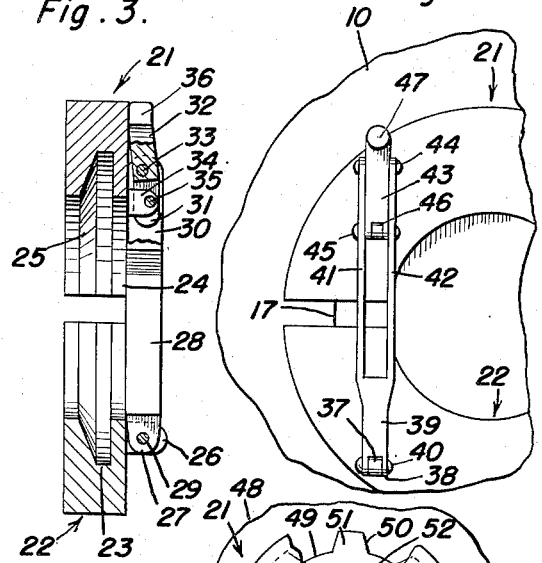
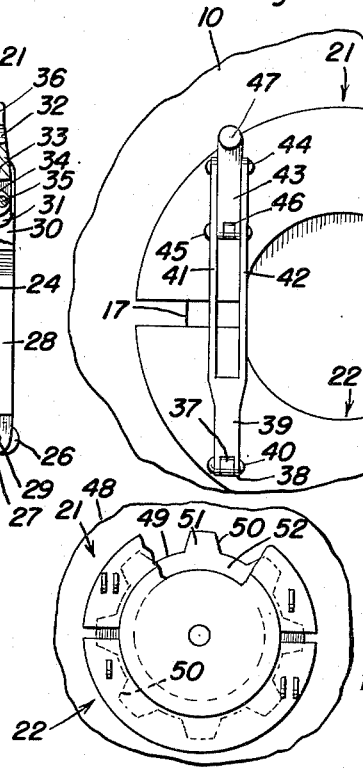
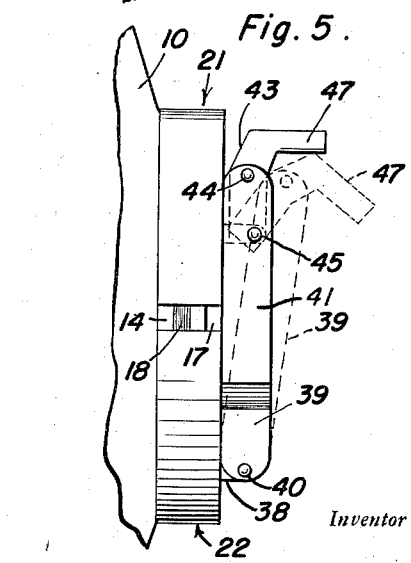
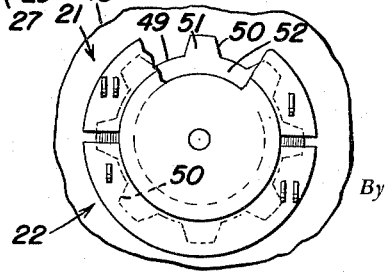
Inventor
Harold L. Kelderman
By
Attorneys Patented Apr. 15, 1952

2,592,707

UNITED STATES PATENT OFFICE 2,592,707

VEHICLE WHEEL AND MOUNTING MEANS THEREFOR

Harold L. Kelderman, Oskaloosa, Iowa

Application June 14, 1949, Serial No. 98,933

1 Claim. (Cl. 301—9)

The present invention relates to vehicle wheels and novel and reliable means whereby same may be demountably secured on a wheel supported axle structure.

The invention appertains, more specifically classified, to so-called automobile and truck wheels. It is a matter of common knowledge that the commonly used automobile wheel, if of the disk type, is provided with a rim structure carrying a pneumatic tire and has an apertured hub portion which is secured by nut-equipped lugs on a complemental brake drum structure at one end of the axle. The clamping nuts are accessible, generally speaking, by way of a readily applicable and removable hub cap.

It is an object of the present invention to structurally, functionally and otherwise improve upon a vehicle wheel and mode and means whereby same may be adequately and reliably mounted for use and subsequently demounted for changing a tire. To this end, novelty is, therefore, predicated upon an especially designed adapter head which is made integral with the brake drum and which serves to satisfactorily mount and support a coacting portion of the wheel body and, in addition, constitutes a practical fixture to accommodate a readily applicable and removable clamping collar which latter, when locked, serves to effectively retain the wheel in place on the stated adapter.

It is an object of the invention to provide, in addition to the stated adapter head, added facilities, such as lugs or cogs, to assist in mounting the wheel and to prevent the same from rotating in relation to the brake drum.

Novelty, in addition to the above stated, has to do with a two-part wheel assembling and retaining collar having quickly openable and closable linkage devices which allow the collar to be expeditiously applied and removed and also insure its maintenance once it is locked or latched in place on the stated adapter.

Other objects and advantages will become more readily apparent from the following description and the accompanying illustrative drawings.

In the accompanying sheet of drawings, wherein like numerals are employed to designate like parts throughout the views:

Figure 1 is an elevational view of an automobile wheel constructed in accordance with the principles of the present invention.

Figure 2 is an enlarged fragmentary view in section and in elevation, taken on the plane of the line 2—2 of Figure 1, looking in the direction of the arrows.

Figure 3 is a view in section and elevation through the clamping collar.

Figure 4 is a fragmentary elevational view showing a modified collar latching device which may be used on wheels which are employed on heavy-duty trucks.

Figure 5 is a fragmentary elevational view of the structure seen in Figure 4, observing same in a direction from left to right.

Figure 6 is a fragmentary elevational view showing modified anchoring means for fastening the wheel against rotation on the hub structure.

Referring to the drawings by distinguishing reference numerals and lead lines, the automobile or vehicle axle is denoted by the numeral 8 and has integral therewith the brake housing or drum structure 9, sometimes referred to, generally speaking, as a wheel attaching and mounting hub structure. Others refer to the "hub" as being merely on the vehicle wheel, which latter is of a disk type and denoted by the numeral 10. The wheel has a marginal rim 11 to support the usual pneumatic tire 12. In accordance with the present invention, the central or hub portion of the wheel disk has a central opening 13 to snugly surround an annular fixed shoulder 14 forming a salient part of the adapter head 15. Said adapter head also includes an endless channel or groove 16 and a flange 17 spaced from the annular boss 14. The inner peripheral wall of the flange 17 is beveled, as at 18. The drum structure 9 is also distinctive from the type commonly used, in that it includes placement and anchoring pins or lugs 19. These are situated at circumferentially spaced points and adapted to fit into openings 20 provided therefor in the wheel disk 10, as shown in Figure 2. Thus, and so far, we may picture a disk wheel having a central opening which is properly shaped to conform to and contact the usual brake drum and which has smaller holes around the central opening to accommodate the locating and setting studs 19. We also note that the centrally apertured portion or hub opening 13 in the wheel surrounds and fits snugly and is supported, in part, by the annular boss, a component of the stated adapter head on the brake drum. The adapter head also serves to accommodate a sectional clamping collar. The collar is here shown as made up of semi-circular complemental sections 21 and 22 (see Figure 3). Each section has a channel or groove 23 with coacting walls 24 and 25, the wall 25 being beveled to correspond with the bevel 18 on the flange 17 of the stated adapter head. Thus, we have interfitting elements on the collar and head respectively. That is to say, the flanges 25 on the collar sections fit down into the channel 16 of the head and, by the same token, the marginal edge of the flange 17 on the head fits into the channels or grooves 23 in the collar sections. Not only do the collar sections interlock with the adapter head, but latching devices are necessary to insure maintenance of the collar sections, once they are fitted about said head.

I provide a pair of toggle-type linkage devices for each clamping collar to properly balance and retain the collar in place, and so that, when once the collar is lodged and fastened, it projects radially beyond the marginal portion of the adapter head and binds and securely clamps the wheel disk between itself and the lug-equipped surface of the brake drum housing, as shown in Figure 2. Each linkage device, the kind used on the automobile wheel shown in Figures 1, 2 and 3, is the same in construction and the description of one will suffice for both. To this end, the collar section 22 in Figure 3 is provided with integral spaced lugs 26 to accommodate a lug or ear 27 on the lever 28. The respective lugs 26 and 27 are hingedly pinned together, as at 29. The free end portion of the lever is formed with a fork, whose arms 30 straddle the coacting arms 31 of a smaller fork on the finger actuable latch 32. More specifically, the fork arms 30 straddle and are hingedly connected at 33 to the latch and the fork arms 31 on the latch straddle a lug 34 on the collar section 21 and are pinned or hingedly connected thereto as at 35. Thus, a toggle joint is provided between the respective lever and latch members in order to draw the collar sections together and firmly bind same around the adapter head. The free end portion of the latch 22 is provided with a curvate finger 36 which may be grasped by the user's fingers for opening and closing purposes. The finger-piece 36 is pulled away from the clamp to break the joint and to allow the collar sections to be separated so that they will clear the flange 17. This allows the entire clamping collar to be bodily dislodged from the adapter head. Then, the wheel is free to be lifted off and the tire changed and subsequently replaced in an obvious manner. In order to secure a balance in pressures and distribution of forces, I have found it advisable to reverse the respective positions of the two toggle-type linkage devices as shown in Figure 1. That is to say, the levers are hinged in reversed positions on the coacting collar sections, thus putting one fingerpiece at the bottom, so to speak, and the other one at the top.

In the slight modification seen in Figure 4, all of the parts are the same as described and the only difference is in the linkage device. This is a larger type of latch means and is adapted to be used on heavy-duty truck wheels and tires. Here, as shown, there is a single lug 37 to accommodate the ears 38 on the lever 39, the ears being pinned to the lug for proper hinging connection, as at 40. The lever has elongated links 41 in spaced parallelism with each other, which links straddle the latch member 43 and are hinged thereto at 44. The latch member is, in turn, hingedly mounted, as at 45, on a lug 46 carried by the coacting collar section. The latch finger-piece in this arrangement is denoted at 47 but, instead of being a "finger-piece," is preferably a tool grip and is made to accommodate a wrench (not shown). This type of fastener, resembling, in some instances, a slack takeup type used on automobile anti-skid chains, is difficult to open and close and therefore the tool grip 47 will come in handy.

In the modification shown in Fig. 6, the clamping collar means will be the same and latching devices will also be the same. The wheel disk is denoted by the numeral 48 and the central hub opening or aperture 49, instead of being a continuous unbroken circle, is provided at circumferentially spaced points with keeper notches 50, these being adapted to accommodate cog teeth 51 on a toothed shoulder 52 forming an integral part of the aforementioned adapter head on the brake drum. Thus, in this arrangement, I dispense with the holes 20 and the lugs 19 on the brake drum. Also, instead of using the circular hole 13, I provide same with notches to accommodate the cog teeth on the toothed head member 52, all as shown and described. Since Figure 6 is intended to illustrate only the fact that the disk wheel is notched and fitted on a toothed or cog-equipped adapter head, the other details appearing need not be described, it is believed.

It will be seen from the foregoing that I have evolved and produced a simple, practical and economical structure which is characterized by a brake drum housing having integral hub-positioned adapter means which serves as a mount for the centrally apertured portion of the disk wheel, means being provided to prevent rotation of the wheel in relation to the brake housing. In addition, the adapter head means which serves as the stated mount is so made as to accommodate a two-part or sectional collar. The collar sections surround the head and are interlocked with parts of the head and, in addition, are latched firmly together so that they may be applied and removed. The collar serves as a retainer and prevents endwise displacement of the wheel from the brake drum.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

In a structure of the class described, in combination, a wheel axle construction including a brake housing having an outstanding centrally located adapter, said adapter being marginally and circumferentially grooved to define an inward annular wheel mount and a companion flange, said flange being annular, spaced outwardly from the mount and being adapted to accommodate and retain a clamping collar, and a clamping collar adapted to hold a wheel in operative position on said adapter, said collar comprising a pair of duplicate semi-circular half-sections, said half-sections having grooves in their inner peripheral edge portions and said flange fitting into and occupying the respective grooves, a pair of manually actuable complemental levers hingedly mounted on said half-sections, take-up and retaining latches hingedly mounted on said half-sections, and pivotal connections between the respective levers and latches, said levers and latches providing toggle-type linkage connections between said half-sections, said linkage connections being of over-all lengths less than the diameter of said clamping collar so that no portions of said connections project beyond the outer peripheral edge of the collar.

HAROLD L. KELDERMAN.

REFERENCES CITED

The following references are of record in the file of this patent:

UNITED STATES PATENTS

| Number | Name | Date |
|---|---|---|
| 466,582 | Smith | Jan. 5, 1892 |
| 663,208 | Wrensch | Dec. 4, 1900 |
| 665,101 | Jones | Jan. 1, 1901 |
| 1,814,161 | Hynan | July 14, 1931 |
| 1,904,371 | Hynan | Apr. 18, 1933 |
| 2,513,032 | Lewis | June 27, 1950 |

FOREIGN PATENTS

| Number | Country | Date |
|---|---|---|
| 248,982 | Great Britain | 1926 |
| 782,683 | France | June 8, 1935 |
| 728,261 | Germany | Nov. 24, 1942 |